United States Patent Office 2,918,458
Patented Dec. 22, 1959

2,918,458

PROCESS AND CATALYST FOR PRODUCTION OF OLEFIN POLYMERS

Gene Nowlin and Harold D. Lyons, Bartlesville, Okla., assignors to Phillips Petroleum Company, a corporation of Delaware No Drawing. Application May 23, 1955
Serial No. 510,550

17 Claims. (Cl. 260—94.9)

This invention relates to the polymerization of olefins. In one aspect, this invention relates to an improved method for polymerizing olefins in the presence of a novel catalyst system.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. The most valuable polymers, however, are higher molecular weight polymers which have desirable properties of heat stability and can be molded into vessels, pipes and tubing. Such uses cannot be made of the lower molecular weight polymers, for example, a polymer having a molecular weight of about 2000, since a polymer of this molecular weight is a wax-like material.

An object of this invention, therefore, is to provide an improved process for the production of olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement is obtained when an olefin such as ethylene is polymerized in the presence of a catalyst composition comprising a mixture of a complex metal halide having the formula $M_2M'X_6$ wherein M is an alkali metal or ammonium radical, M' is a metal of Group IV-A (Mendeléeff's Periodic System), including titanium, zirconium, hafnium and thorium, and X is a halogen, preferably fluorine or chlorine, and at least one component selected from the following (a) a hydride or organo compound of one of the metals aluminum, gallium, indium, thallium, sodium, potassium, lithium, rubidium, cesium, beryllium, magnesium, zinc, cadmium and mercury; (b) an organometal halide corresponding to the formula $R_nMX_y$, wherein R is a saturated acrylic hydrocarbon radical, a saturated cyclic hydrocarbon radical, an aromatic hydrocarbon radical, or combination of these radicals, wherein M is a metal selected from the group consisting of aluminum, gallium, indium, thallium, and beryllium and wherein X is a halogen, and wherein n and y are integers, the sum of n and y being equal to the valence of the metal; (c) a mixture of an organic halide and at least one metal selected from the group consisting of sodium, potassium, lithium, rubidium, cesium, beryllium, magnesium, zinc, cadmium, mercury, aluminum, gallium, indium and thallium; and (d) a metal selected from the group consisting of sodium, potassium, lithium, rubidium, cesium, beryllium, magnesium, zinc, cadmium, mercury, aluminum, gallium, indium and thallium. As indicated, the catalyst composition of this invention comprises a complex metal halide of formula MM'X, where the symbols of the formula are as indicated above, together with mixtures of components (a), (b), (c) and (d) as well as mixtures of the aforementioned complex metal halide and any one, two, three or four of components (a), (b), (c) or (d). The improvement obtained when polymerizing an olefin in the presence of our novel catalyst is, firstly, that polymers of much higher molecular weight can be obtained than is true when certain of the prior art catalysts have been employed, and secondly, the polymerization reaction, particularly for ethylene, can be initiated and carried out at considerably lower temperatures and pressures than are necessary when employing the catalysts and the processes of the prior art.

The complex metal halide component of our catalyst system comprises at least one of the compounds corresponding to the formula $M_2M'X_6$, wherein M is one of the group consisting of sodium, potassium, lithium, rubidium, cesium and ammonium radical, M' is one of the group consisting of titanium, zirconium, hafnium, and thorium, and X is one of the group consisting of bromine, chlorine, fluorine and iodine. Mixtures of two or more of these complex halides can be employed in the practice of this invention. In general, these compounds are relatively high melting solids, and it is believed that they are complex metal halide salts. Any of the known or available complex salts, including potassium fluotitanate ($K_2TiF_6$), potassium fluozirconate ($K_2ZrF_6$), lithium fluotitanate ($Li_2TiF_6$), potassium chlorozirconate ($K_2ZrCl_6$), cesium fluozirconate ($Cs_2ZrF_6$), ammonium chlorotitanate (($NH_4)_2TiCl_6$), potassium fluothoriate ($K_2ThF_6$), and potassium fluohafniate ($K_2HfF_6$), can be employed in our process. The complex metal halides which are preferably used in the catalyst composition of this invention are potassium fluotitanate and potassium fluozirconate.

In admixture with one or more of the complex metal halides described above, our novel catalyst comprises a hydride or organo compound of the metals aluminum, gallium, indium, thallium, sodium, potassium, lithium, rubidium, cesium, beryllium, magnesium, zinc, cadmium, and mercury. The general formula for the latter compound is $M'R'_n$, wherein M' is one of the foregoing metals, and R' is a hydrogen, a monovalent saturated acylic hydrocarbon radical, a monovalent saturated cyclic hydrocarbon radical, a monovalent aromatic hydrocarbon radical or any combination thereof, and wherein n is the valence of the metal, i.e., 1, 2 or 3. Examples of these compounds corresponding to the formula $M'R'_n$ which can be used are $Al(C_6H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_3$
$Al(CH_2\!-\!(CH_2)_{18}\!-\!CH_3)_3$, $Ga(C_6H_5)_3$, $In(C_6H_5)_3$ $C_2H_5Na$, $C_3H_7K$, $C_4H_9Li$ and the like. These $M'R'_n$ compounds can also be used in the form of their known and stable organic complexes, such as complexes with ethers, thioethers, amines, alkali metal hydrides, alkali metal alkyls or alkali metal aryls. Examples of such complex compounds which can be used in admixture with a complex metal halide as the catalyst are $LiAlH_4$, $NaAl(CH_3)_4$, $NaBe(C_6H_5)_3$, $NaBe(C_2H_5)_3$ and the like.

Alternatively, or in addition to $M'R'_n$ compounds set forth above, our catalyst comprises a mixture of one or more of the complex metal halides and at least one organometal halide corresponding to the formula $R_nMX_y$, wherein R is a saturated acyclic hydrocarbon radical, a saturated cyclic hydrocarbon radical, an aromatic hydrocarbon radical, or mixtures of these radicals, wherein M is a metal selected from the group consisting of aluminum, gallium, indium, thallium and beryllium, and wherein X is a halogen. The $n$ and $y$ are integers and the sum of $n$ and $y$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $$C_{20}H_{41}GaBr_2$$

$(C_{14}H_{29})_2GaF$, $(C_6H_5)_2InCl$ (benzene derivative), $$C_8H_{17}InF_2$$

$(C_6H_{11})InBr_2$ (cyclohexane derivative), $C_{17}H_{35}BeI$, $CH_3BeBr$ and the like.

Alternatively, or in addition to the $M'R'_n$ compounds and/or $R_nMX_y$ compounds set forth above, our catalyst comprises a mixture of one or more of the complex metal halides and a mixture of an organic halide and a free or elemental metal. These organic halides include chloro-, bromo-, iodo- and fluoro-substituted organic halides, and can be mono-, di-, tri- or tetra-substituted organic halides. Within the broad class of organic halides which is a component of our novel catalyst composition, the class of halides defined as monohalogen-substituted hydrocarbons having a maximum carbon chain length of not greater than 8 carbon atoms are preferred since they are more easily handled in a commercial operation and are active to initiate the polymerization of olefins in the catalyst composition of this invention. Still more desirably, the organic halide which is used in the catalyst is a lower alkyl monohalide having a maximum carbon chain length of not greater than 8 carbon atoms. Examples of these organic halides which can be used in the catalyst are ethyl bromide, propyl chloride, butyl iodide and pentyl fluoride. Other examples are 1,2-dibromoethane, 1,3-dibromopropane, 1,2,3-tribromopropane, 1,2,3-trichloropropane, 1,1-difluoroethane, and 1,4-diiodobutane. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride and phenyl chloride. Also alkenyl halides, such as allyl bromide, and alkynyl halides, such as propargyl chloride, can be used. The metals which are employed in admixture with an organic halide include one or more of sodium, potassium, lithium, rubidium, cesium, beryllium, magnesium, zinc, cadmium, mercury, aluminum, gallium, indium, and thallium. The metals are usually used in the form of shavings, turnings or finely divided powder. Various mixtures or combinations of the above-mentioned organic halides and metals can be employed in the catalyst composition of this invention.

Alternatively, or in addition to the $M'R'_n$ compounds and/or $R_nMX_y$ compounds and/or the mixture of an organic halide and a free or elemental metal, as set forth above, our catalyst comprises a mixture of one or more of the complex metal halides and at least one metal selected from the group consisting of sodium, potassium, lithium, rubidium, cesium, beryllium, magnesium, zinc, cadmium, mercury, aluminum, gallium, indium and thallium. These metals are usually employed in the form of shavings, turnings or finely divided powder and various mixtures or combinations of at least one of the complex metal halides and these metals can be employed as the catalyst in accordance with this invention.

As has been indicated, all possible combinations of a hydride or organo compounds corresponding to the formula $M'R'_n$ and/or an organometal halide corresponding to the formula $R_nMX_y$ and/or a mixture of an organic halide and a free or elemental metal as set forth above and/or at least one metal selected from the group set forth above together with one or more of the complex metal halides are used in the catalyst composition of this invention. The catalyst compositions falling within the scope of this disclosure which are preferred because their use to catalyze the polymerization of olefins provides relatively high molecular weight polymers and/or permits the use of relatively low reaction temperatures and pressures are the following: A mixture of potassium fluotitanate with an approximately equimolar mixture of ethylaluminum dichloride and diethylaluminum chloride; a mixture of potassium fluotitanate and triethylaluminum; a mixture of potassium fluotitanate and lithium aluminum hydride; a mixture of potassium fluotitanate, ethyl bromide and free or elemental magnesium; and a mixture of potassium fluorzirconate with an approximately equimolar mixture of ethylaluminum dichloride and diethylaluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of organometal compound to complex metal halide will usually be in the range of 0.05 to 50, preferably 0.1 to 5, mols of organometal compound per mol of complex metal halide. The ratio of alkyl metal halide to complex metal halide will be in the range of 0.05 to 50, preferably 0.1 to 5, moles of alkyl metal halide per mol of complex metal halide. The ratio of the amounts of organic halide, metal and complex metal halide will be in the range of 0.02 to 50 mols of the organic halide per mol of the complex metal halide and from 0.02 to 50 mols of the metal per mol of the complex metal halide. A preferred ratio is from 0.1 to 5 mols of alkyl halide per mol of complex metal halide and from 0.1 to 5 mols of metal per mol of the complex metal halide. When a metal of the class defined above is employed with a complex metal halide the ratio of the components will vary from 0.02 to 50 mols of the metal, preferably from 0.1 to 5 mols, of the metal per mol of the complex metal halide.

The materials which are polymerized in accordance with this invention are polymerizable hydrocarbons, broadly. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylenes can be used, such as butene-2, pentene-2, hexene-2, heptene-3, 2-methyl-butene-1, 2-methyl-hexene-1, 2-ethyl-heptene-1, and the like. Examples of the di- and poly-olefins in which the double bonds are in no-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention.

One of the important advantages obtained in the polymerization of olefins in the presence of our novel catalyst is that lower temperatures and pressures can be used than in certain of the prior art processes. The temperature can be varied over a rather broad range, however, such as from zero to 500° F. The preferred temperature range is from 100 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, halogenated paraffins, cycloparaffins and/or aromatic hydrocarbons which are relatively inert, non-deleterious and liquid under the conditions of the process. The lower molecular weight alkanes, such as propane, butane, and pentane can be used as well as the higher molecular weight paraffins and cycloparaffins, such as isooctane, cyclohexane and methylcyclohexane. Halogenated aromatics, such as chlorobenzene, and aromatic diluents can also used, such as benzene, toluene, and the like, particularly when operating at higher temperatures. Mixtures of any two or more of these diluents can also be used.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely also, such as up to 24 hours or more.

Various materials are known to be poisons for the catalyst compositions of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable also that air and moisture be removed from the reaction vessel before the reaction is carried out.

At the completion of the polymerization reaction, when a batch process is used, the reactor is cooled to about room temperature, any excess olefin is vented, and the contents of the reactor, including the solid polymer swollen with diluent, is removed from the reactor. The total reactor effluent is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration after which the polymer is dried. When the process of the invention is carried out continuously, the total effluent from the reactor, including polymer, diluent and catalyst system is pumped from the reactor as a slurry to a catalyst-inactivating zone where the reactor effluent is cooled and contacted with a suitable catalyst-inactivating material, such as an alcohol. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process.

EXAMPLE

A catalyst composition consisting of a mixture of 2 grams of potassium fluotitanate ($K_2TiF_6$) and 2.8 cubic centimeters of a mixture of diethyl aluminum chloride and ethyl aluminum dichloride was prepared.

The mixture of diethylaluminum chloride and ethylaluminum dichloride was prepared by placing 150 grams of aluminum shavings in a flask fitted with a reflux condenser and heated to about 70° C. A trace of iodine was added to the flask to act as a catalyst and ethyl chloride was charged to the flask in liquid phase. The temperature of the reaction mixture was maintained in the range of 120 to 150° C. during the addition of ethyl chloride and the reaction mixture was maintained under a nitrogen atmosphere. When substantially all of the aluminum shavings had reacted with the ethyl chloride, the liquid product was removed from the flask and fractionally distilled at 4.5 millimeters mercury pressure in a packed distillation column. 2.8 cubic centimeters of the distillate, boiling at 72 to 74° C. at 4.5 millimeters mercury pressure, was used in the catalyst composition of this invention, as set forth above. This fraction boiling at 72 to 74° C. was analyzed and was found to contain 47.4 weight percent chlorine. The theoretical chlorine content for an equimolar mixture of diethylaluminum chloride and ethylaluminum dichloride is 43 weight percent.

The potassium fluotitanate, which was in the form of light cream colored granular powder, was obtained from the Harshaw Chemical Company, Houston, Texas, and had the following properties:

| Apparent Density | Approximately 10 lbs. per gallon |
|---|---|
| Assay: | Percent |
| $K_2TiF_6$ | 99.4 |
| $H_2O$ insol | 0.03 |
| Loss at 105° C | .07 |

The ethylene used in the polymerization was obtained from the Matheson Company, Incorporated, of Joliet, Illinois, and had a purity of 99.5 percent.

Ethylene was polymerized in a 2700 cubic centimeter, stainless steel rocking autoclave in the presence of the catalyst of this invention as described above, i.e., a mixture of 2 grams of potassium fluotitanate and 2.8 cubic centimeters of a mixture of diethylaluminum chloride and ethylaluminum dichloride. The autoclave was charged with 370 cubic centimeters of cyclohexane (dried over sodium) prior to the addition of the catalyst components. The reactor was flushed with nitrogen prior to and during the charging procedure to prevent contact of the catalyst with air or moisture. The ethylene feed was passed through a purification system to remove oxygen, carbon dioxide, and water vapor prior to entering the reactor. The purification system comprised a pyrogallol solution, a sodium hydroxide solution, and drying agents.

Ethylene was added to the autoclave containing the cyclohexane and catalyst until a pressure of about 300 p.s.i.g. was reached. The autoclave and contents were at a temperature of approximately 85° F. at the time the ethylene was charged. The reactor and contents were heated up gradually after the addition of the ethylene and at the end of about 45 minutes the temperature had increased to 160° F. and the pressure was about 290 p.s.i.g. It is believed that the initiation of the polymerization occurred at some point during this 45-minute period and before the temperature reached 160° F. At the end of the above-mentioned 45-minute period the heat to the reactor was reduced and polymerization allowed to continue for an additional 25 minutes. At the end of this period, the temperature had increased to 187° F. At this point the heating of the reactor and contents was discontinued and an attempt was made to add additional ethylene to the reactor. It appeared that the line through which the ethylene entered the reactor may have been partially plugged and for that reason the gauge pressure may not have been an accurate indication of the actual pressure in the reaction vessel. This was indicated by the fact that the pressure indicated by the gauge increased more rapidly than would normally be expected when the valve in the ethylene line was opened. However, since some ethylene was being admitted to the reactor the polymerization was continued for an additional period of 1 hour and 40 minutes. During this period the reactor was repressured with ethylene at two different times as was necessary to maintain the pressure above approximately 275 p.s.i.g. At the end of the reaction period the temperature was about 160° F. and the pressure was about 250 p.s.i.g. At this point unreacted ethylene was bled from the reactor and the reactor was cooled to room temperature with water. When the reactor was opened it was found that a portion of the polymer was present as a coating on the thermowell and a portion was present as cakes of solid material. Portions of the polymer were white while other portions were tan in color. The solvent appeared to be dissolved in or absorbed by the solid polymer. The polymer was comminuted in a Waring Blendor in the presence of methyl alcohol. The finely divided solid material was separated from the liquid and dried in a vacuum oven at about 172° F. and a pressure of less than 10 mm. of mercury absolute. About 75 grams of a white powdered polymer of ethylene was obtained.

The properties of a compression molded sample of this ethylene polymer are presented below in the table.

*Table*

| | |
|---|---|
| Density, grams/cc. | 0.983 |
| Melting point, ° F. | 253 ±2 |
| Melt index | 0.033 |
| Molecular weight (based on melt index) | 65,000 |
| Flexibility | Low |

The polymers and copolymers produced in accordance with this invention have utility in applications where solid plastics are used. They can be molded to form articles of any desired shape, such as bottles and other containers for liquids. Also, they can be formed into pipe by extrusion.

As will be evident to those skilled in the art many variations and modifications can be practiced which fall within the scope of the disclosure of this invention. The invention resides in an improved polymerization process for olefins as described herein comprising the use of a novel catalyst composition and in the polymer so produced, said catalyst composition comprising at least one complex metal halide of the formula $M_2M'X_6$, where the symbols of the formula are as defined hereinabove, and at least one member selected from the group consisting of (a) a compound of a metal selected from the group consisting of aluminum, gallium, indium, thallium, sodium, potassium, lithium, rubidium, cesium, beryllium, magnesium, zinc, cadmium and mercury having the valence linkages thereof individually bound to members selected from the group consisting of hydrogen, saturated acyclic hydrocarbon radicals, saturated cyclic hydrocarbon radicals, and aromatic hydrocarbon radicals and alkali metal hydride, alkali metal alkyl and alkali metal aryl complexes of said compound of a metal; (b) an organo-metal halide corresponding to the formula $R_nMX_y$, wherein R is at least one member selected from the group consisting of saturated acyclic hydrocarbon radicals, saturated cyclic hydrocarbon radicals, and aromatic hydrocarbon radicals, M is a metal selected from the group consisting of aluminum, gallium, indium, thallium and beryllium, X is a halogen, $n$ and $y$ are integers, the sum of $n$ and $y$ being equal to the valence of said metal; (c) a mixture of an organic halide, and at least one free metal selected from the group consisting of sodium, potassium, lithium, rubidium, cesium, beryllium, magnesium, zinc, cadmium, mercury, aluminum, gallium, indium and thallium; and (d) a metal selected from the group consisting of sodium, potassium, lithium, rubidium, cesium, beryllium, magnesium, zinc, cadmium, mercury, aluminum, gallium, indium and thallium.

We claim:

1. A method for polymerizing a polymerizable hydrocarbon which comprises contacting said hydrocarbon with a catalyst comprising a complex metal fluoride of the formula $M_2M'F_6$ wherein M is an alkali metal and M' is a metal selected from the group consisting of titanium and zirconium, and a member selected from the group consisting of (a) a trialkylaluminum, (b) an organometal halide corresponding to the formula $R_nAlX_y$, wherein R is an alkyl radical, X is a halogen, and $n$ and $y$ are integers, the sum of $n$ and $y$ being equal to the valence of aluminum, and (c) a mixture of an alkyl halide and magnesium.

2. A method in accordance with claim 1 wherein said polymerizable hydrocarbon is an aliphatic 1-olefin having up to and including 8 carbon atoms per molecule.

3. A method for polymerizing ethylene which comprises contacting said ethylene with a catalyst consisting essentially of a mixture of potassium fluotitanate and an approximately equimolar mixture of ethylaluminum dichloride and diethylaluminum chloride.

4. A method for polymerizing ethylene which comprises contacting said ethylene with a catalyst consisting essentially of a mixture of potassium fluotitanate and triethylaluminum.

5. A method for polymerizing ethylene which comprises contacting said ethylene with a catalyst consisting essentially of a mixture of potassium fluotitanate and lithium aluminum hydride.

6. A method for polymerizing ethylene which comprises contacting said ethylene with a catalyst consisting essentially of a mixture of potassium fluotitanate, ethylbromide and elemental magnesium.

7. A method for polymerizing ethylene which comprises contacting said ethylene with a catalyst consisting essentially of a mixture of potassium fluozirconate and an approximately equimolar mixture of ethylaluminum dichloride and diethylaluminum chloride.

8. A method for producing a solid polymer of an aliphatic 1-olefin having up to and including 8 carbon atoms per molecule which comprises contacting said olefin with a catalyst comprising a complex metal fluoride having the formula $M_2M'F_6$, wherein M is an alkali metal and M' is a metal selected from the group consisting of titanium and zirconium, and a member selected from the group consisting of (a) a trialkylaluminum, (b) an organometal halide corresponding to the formula $R_nAlX_y$, wherein R is an alkyl radical, X is a halogen, and $n$ and $y$ are integers, the sum of $n$ and $y$ being equal to the valence of aluminum, and (c) a mixture of an alkyl halide and magnesium, at a temperature in the range from zero to 500° F., in the presence of a hydrocarbon diluent, inert and liquid under conditions of the method, at a pressure sufficient to maintain said diluent in liquid phase, and recovering the solid polymer so produced.

9. A method in accordance with claim 8 wherein the ratio of the amount of said complex metal halide and said members (a), (b), (c) and (d) in said catalyst is in the following range: from 0.05 to 50 mols of said member (a) per mol of said complex metal halide; from 0.05 to 50 mols of said member (b) per mol of said complex metal halide; from 0.02 to 50 mols of said organic halide and from 0.02 to 50 mols of said free metal in said member (c) per mole of said complex metal halide; and from 0.02 to 50 mols of said free metal defined in said member (d) per mol of said complex metal halide.

10. A method in accordance with claim 8 wherein the ratio of the amount of said complex metal halide and said members (a), (b), (c) and (d) in said catalyst is in the following range: from 0.1 to 5 mols of said member (a) per mol of said complex metal halide; from 0.1 to 5 mols of said member (b) per mol of said complex metal halide; from 0.1 to 5 mols of said organic halide and from 0.1 to 5 mols of said free metal in said member (c) per mol of said complex metal halide; and from 0.1 to 5 mols of said free metal defined in said member (d) per mol of said complex metal halide.

11. A method for polymerizing ethylene which comprises, contacting ethylene with a catalyst consisting essentially of a mixture of from 0.1 to 5 mols of an approximately equimolar mixture of diethylaluminum chloride and ethylaluminum dichloride per one mol of potassium fluotitanate, in the presence of a hydrocarbon diluent, inert and liquid under conditions of the method at a temperature in the range from 100 to 350° F. and a pressure in the range from 100 to 1000 p.s.i.g.

12. A catalyst composition comprising a complex metal fluoride having the formula $M_2M'F_6$, wherein M is an alkali metal and M' is a metal selected from the group consisting of titanium and zirconium, and a member selected from the group consisting of (a) a trialkylaluminum, (b) an organometal halide corresponding to the formula $R_nAlX_y$, wherein R is an alkyl radical, X is a halogen, and $n$ and $y$ are integers, the sum of $n$ and $y$ being equal to the valence of aluminum, and (c) a mixture of an alkyl halide and magnesium.

13. A catalyst composition consisting essentially of a mixture of potassium fluotitanate, diethylaluminum chloride and ethylaluminum dichloride.

14. A catalyst composition consisting essentially of a mixture of potassium fluotitanate and triethylaluminum.

15. A catalyst composition consisting essentially of a mixture of potassium fluotitanate and lithium aluminum hydride.

16. A catalyst composition consisting essentially of a mixture of potassium fluotitanate, ethyl bromide and elemental magnesium.

17. A catalyst composition consisting essentially of a mixture of potassium fluozirconate, diethylaluminum chloride and ethylaluminum dichloride.

References Cited in the file of this patent

UNITED STATES PATENTS

| | | |
|---|---|---|
| 2,721,189 | Anderson | Oct. 18, 1955 |
| 2,822,357 | Brebner et al. | Feb. 4, 1958 |

FOREIGN PATENTS

| | | |
|---|---|---|
| 642,420 | Great Britain | June 9, 1950 |
| 534,792 | Belgium | Jan. 31, 1955 |
| 533,362 | Belgium | May 16, 1955 |